UNITED STATES PATENT OFFICE.

RICHARD ARENS, OF MARXLOH, GERMANY.

PROCESS OF MAKING GLUE.

SPECIFICATION forming part of Letters Patent No. 721,852, dated March 3, 1903.

Application filed December 16, 1902. Serial No. 135,455. (No specimens.)

*To all whom it may concern:*

Be it known that I, RICHARD ARENS, a subject of the King of Prussia, Emperor of Germany, residing at Marxloh, near Ruhrort, Germany, have invented certain new and useful Improvements in the Manufacture of Glue, Gelatin, and the Like; and I do hereby declare the following to be a full, clear, and exact description of the invention, such as will enable others skilled in the art to which it appertains to make and use the same.

The methods hitherto employed for extracting phosphate of lime from bones and the like in the manufacture of glue and gelatin consists in treating the material with dilute hydrochloric acid. The phosphate of lime is dissolved out, forming monobasic calcium phosphate and chlorid of calcium, and there remains behind the pure cartilage or gristle which is suitable for further manufacture as a substance capable of yielding glue. This method has the disadvantage that the hydrochloric acid employed is lost as a solution of chlorid of calcium, and hitherto it has not been possible to employ any suitable means for its recovery. Consequently for a long time past watery sulfurous acid has been employed in order to free the bone material from the lime salts. The technical difficulties in dissolving with sulfurous acid are, however, considerable, and as yet it has been impossible to obtain any favorable results. The decomposition of the material proceeds so slowly that even where a very considerable excess of acid is employed, in case it is desired to entirely free the bone material from lime, it takes eighty to ninety days to carry out this operation. I have, however, found that the reason for the weak action of the acid on the bone material is that the sulfurous-acid solution, which at its maximum strength at ordinary atmospheric pressure and 15° centigrade contains forty-three and one-half volumes of sulfurous acid, in acting on the material first forms neutral calcium sulfite. This substance is insoluble in water and is held in solution only by an excess of sulfurous acid; but its solubility ceases as soon as the free sulfurous acid still present attacks further quantities of lime and the monobasic phosphate of lime commences to saturate the lye. The calcium sulfite is then precipitated and incrusts the bone material. If then fresh quantities of sulfurous-acid solution be added to the material, the precipitated calcium sulfite must be dissolved in the $SO_2$. When this has been done, the acid solution can again form fresh quantities of calcium sulfite and bring into solution acid calcium phosphate. The point is then again reached where the calcium sulfite can no longer be held in solution. It is thus evident that lye which contains an excess of free sulfurous acid in large quantities cannot be strengthened further and no longer acts on the bone material, but diminishes in its strength. By this precipitation of the calcium sulfite and redissolving of the same, as already stated, a long time is required for completing the operation together with an excess of acid which exceeds the theoretical quantity by fifty per cent.

The present process allows of the material being dissolved in a very much shorter time with a very small apparatus and the theoretical quantity of acid; but the bone material must be treated with sulfurous acid dissolved in water, the liquid being simultaneously subjected to pressure. By this means the sulfurous acid is much stronger in percentage and the incrustation of the bone material is also avoided, because the lye formed, which is subjected to pressure, has no tendency to crystallize out owing to the excess of sulfurous acid held in solution and the pressure to which the solution is subjected. The process itself is very simple. An iron cylinder which is lined with acid-resisting bricks is filled with the material and the carbonate of lime is first decomposed by conducting sulfurous acid in gaseous form over it according to a known process. The object of this is to avoid the very strong reaction in the decomposition of carbonate of lime and the rise of temperature connected therewith. Two to three per cent. of sulfurous acid suffice for this purpose, which acid in a few hours is absorbed by the material. When this has taken place, the apparatus is sprinkled with water, and the lye which contains almost exclusively calcium sulfite dissolved in sulfurous acid water is formed and discharged or passed into a succeeding apparatus already containing $SO_2$ gas in order to enrich the lye with sulfurous acid. The process can, however, be carried out by leaving the first lye in the apparatus and introducing sulfurous acid until the apparatus indicates a pressure of from one and one-half to two atmospheres. The apparatus is then allowed to stand for twelve hours under pressure, the pressure in the succeeding apparatus being lowered, and the lye which rises to 23° Baumé is drawn off. This operation is repeated three or four times, whereby the material is completely freed from phosphate of lime and softened. The material is then washed in the ordinary manner with water, after which it is ready for boiling. The lyes obtained are boiled down in order to recover $SO_2$, which can now be done much more practically, as they contain sixty to seventy grams $SO_2$ per liter, and with less cost than has hitherto been the case, where the lyes contained at the most twenty to twenty-five grams $SO_2$ per liter. When heated, the dissolved phosphate of lime is reformed, which is precipitated as tribasic phosphate, while $SO_2$ is evolved. By this process a gelatin of great clearness and excellent quality is obtained, which can be made cheaply, as the acid has merely to be recovered.

This process therefore differs from the processes already known in that the phosphate of lime more particularly is easily and rapidly dissolved out by a cold process, so as to leave behind the glue-forming substances, while the gelatin is dissolved from the bone material according to a known process by boiling the bones with sulfites. Further, by the present process, in contrast to the process for treating the bone material by means of gaseous acid in which a dibasic phosphate of calcium insoluble in water and a neutral sulfite are produced, a primary calcium phosphate soluble in water and acid sulfite are produced according to the following equation:

$$Ca_3(PO_4)_2 + 4SO_2 + 4H_2O = CaH_4(PO_4)_2 + 2Ca(HSO_3)_2$$

and this is obtained in a very short time, as the concentrated solution is employed under pressure, while formerly in order to obtain the same object much larger quantities of sulfurous-acid solution had to be allowed to act for a very long time, the action of which, as already stated, depends on the fact that a solution of sulfurous acid which is not under pressure contains only comparatively little acid, which soon ceases to act as insoluble neutral sulfite is formed.

I declare that what I claim is—

The herein-described method of reducing bone material to cartilage or gristle for the manufacture of glue and the like, the same consisting in treating the bone material for a time with a solution of sulfurous-acid gas and then subjecting the material to the action of a concentrated solution of sulfurous acid under pressure of from one and a half to two atmospheres and at the desired temperature until all the lime salts are dissolved, substantially as set forth.

In testimony that I claim the foregoing as my invention I have signed my name in presence of two subscribing witnesses.

RICHARD ARENS.

Witnesses:
PETER LIEBER,
WILLIAM ESSENWEIN.